(12) United States Patent
Schweitzer, III

(10) Patent No.: US 6,920,028 B2
(45) Date of Patent: Jul. 19, 2005

(54) DIGITAL PROTECTIVE RELAY FOR POWER SYSTEMS WITH OPERATOR-INITIATED RECORD KEEPING CAPABILITY

(75) Inventor: Edmund O. Schweitzer, III, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 228 days.

(21) Appl. No.: 10/334,367

(22) Filed: Dec. 30, 2002

(65) Prior Publication Data

US 2004/0125532 A1 Jul. 1, 2004

(51) Int. Cl.⁷ ................................................ H02H 3/00
(52) U.S. Cl. .......................................... 361/78; 361/64
(58) Field of Search .......................... 361/23, 115, 93.1, 361/18, 62, 64, 66, 70, 71, 683, 78

(56) References Cited

U.S. PATENT DOCUMENTS

| 5,160,926 A | * | 11/1992 | Schweitzer, III | ....... 340/870.02 |
| 6,011,480 A | * | 1/2000 | Schweitzer et al. | ......... 340/644 |

* cited by examiner

*Primary Examiner*—Stephen W. Jackson
(74) *Attorney, Agent, or Firm*—Cook, Alex, McFarron, Manzo, Cummings & Mehler, Ltd.

(57) ABSTRACT

A digital protective relay for power systems includes a memory location for storing information entered by an operator concerning the operation of the relay. Conventional reports of the relay will include a reference to such operator-entered information. This information will include particular actions taken by the operator relative to the relay, as well as notes made by the operator on particular actions and/or entry of and changes to the relay settings. The entered information can be conveniently retrieved by the operator.

12 Claims, 4 Drawing Sheets

FIG.4

"HIS" ENTER

Date:     Time:

EXAMPLE: BUS B, BREAKER 3

| # | DATE | TIME | EVENT | LOCAT | CURR | FREQ | GRP | SHOT | TARGETS | NOTES |
|---|------|------|-------|-------|------|------|-----|------|---------|-------|
| 1 | 10/01/99 | 08:33:00.365 | TRIG | $$$$$$$ |    1 | 60.00 | 3 | 2 | | |
| 2 | 10/02/99 | 20:32:58.361 | ER   | $$$$$$$ |  231 | 60.00 | 2 | 2 | | |
| 3 | 10/03/99 | 07:30:11.055 | AG T | 9.65 | 2279 | 60.00 | 3 | 2 | TIME 51 | ABC |

=>

"SER" ENTER

Date:     Time:

EXAMPLE: BUS B, BREAKER 3

| # | DATE | TIME | ELEMENT | STATE | NOTES |
|---|------|------|---------|-------|-------|
| 14 | 10/14/99 | 08:53:34.083 | IN101 | Asserted | |
| 13 | 10/14/99 | 08:53:34.926 | 51G | Asserted | |
| 12 | 10/14/99 | 08:53:34.930 | 50P1 | Asserted | |
| 11 | 10/14/99 | 08:53:34.930 | M2P | Asserted | |
| 10 | 10/14/99 | 08:53:34.930 | M1P | Asserted | |
| 9 | 10/14/99 | 08:53:34.930 | OUT101 | Asserted | |
| 8 | 10/14/99 | 08:53:34.930 | OUT102 | Asserted | |
| 7 | 10/14/99 | 08:53:35.026 | 50P1 | Deasserted | |
| 6 | 10/14/99 | 08:53:35.026 | M1P | Deasserted | |
| 5 | 10/14/99 | 08:53:35.026 | 51G | Deasserted | |
| 4 | 10/14/99 | 08:53:35.030 | M2P | Deasserted | |
| 3 | 10/14/99 | 08:53:35.030 | IN101 | Deasserted | ABC |
| 2 | 10/14/99 | 08:53:35.079 | OUT101 | Deasserted | |
| 1 | 10/14/99 | 08:53:35.079 | OUT102 | Deasserted | |

```
"SHO" ENTER
Group 1    ENTERED 9/11/2002 AT 1514 BY

Group Settings:
                                              =EXAMPLE: BUS B, BREAKER 3
CTR    = 200       CTRP   = 200       PTR   = 2000.00   PTRS   = 2000.00
Z1MAG  = 7.80      Z1ANG  = 84.00
Z0MAG  = 24.80     Z0ANG  = 81.50     LL    = 100.00    APP    = 311C
E21P   = 3         E21MG  = 3         E21XG = 3
E50P   = 1         E50G   = N         E50Q  = N
E51P   = N         E51G   = Y         E51Q  = Y
E32    = AUTO      EOOS   = N         ELOAD = Y         ESOTF  = Y
EVOLT  = N         E25    = N         E81   = N         EFLOC  = Y
ELOP   = Y         ECOMM  = POTT      E79   = N         EZ1EXT = N
ECCVT  = N         ESV    = N         EDEM  = THM       EADVS  = N
Z1P    = 6.24      Z2P    = 9.36      Z3P   = 1.87
50PP1  = 0.50
Z1MG   = 6.24      Z2MG   = 9.36      Z3MG  = 1.87
XG1    = 6.24      XG2    = 9.36      XG3   = 1.87
RG1    = 2.50      RG2    = 5.00      RG3   = 6.00
50L1   = 0.50

Press RETURN to continue
50GZ1  = 0.50
k0M1   = 0.726    k0A1    = -3.69
Z1PD   = OFF      Z2PD    = 20.00     Z3PD  = OFF
Z1GD   = OFF      Z2GD    = 20.00     Z3GD  = OFF
Z1D    = OFF      Z2D     = OFF       Z3D   = OFF
50P1P  = 11.25
67P1D  = 0.00
51GP   = 0.75     51GC    = U3        51GTD = 2.00      51GRS  = Y
51QP   = 2.20     51QC    = U3        51QTD = 2.00      51QRS  = N
ZLF    = 9.22     ZLR     = 9.22
PLAF   = 30.00    NLAF    = -30.00    PLAR  = 150.00    NLAR   = 210.00
DIR3   = R        DIR4    = F
ORDER  = QVI
CLOEND = OFF      52AEND  = 10.00     SOTFD = 30.00
Z3RBD  = 5.00     EBLKD   = 10.00     ETDPU = 2.00
EDURD  = 4.00     EWFC    = N
DMTC   = 60       PDEMP   = OFF       GDEMP = OFF       QDEMP  = OFF
TDURD  = 9.00     CFD     = 60.00     3POD  = 0.50      OPO    = 52
50LP   = 0.25
```

DIGITAL PROTECTIVE RELAY FOR POWER SYSTEMS WITH OPERATOR-INITIATED RECORD KEEPING CAPABILITY

TECHNICAL FIELD

This invention generally concerns the recording of information relating to the operation of a digital protective relay, and more specifically concerns the recording of actions taken by a human operator and related information relative to such a relay.

BACKGROUND OF THE INVENTION

Digital protective relays used for protection, monitoring and control of electric power systems have the processing capability of performing a substantial number of protection functions and storing information concerning faults and other events which occur during the operation of the power system. Typical information developed by such digital relays include oscillographic information as well as the voltage, current and related values from the power line occurring before, during and after a particular event. Voltage and current values from the power line are sampled at regular intervals, e.g. 16 samples per power system cycle. Still other information developed by some relays in typical operation includes the location of faults, the relay settings and the condition of relay targets.

In an integrated protection system, such as shown generally in FIG. 1, information developed by a digital relay is typically transmitted, either automatically or manually, from individual relays 12—12 present at a substation 13, for instance, to a remote terminal unit (RTU) or communication processor 14, and from there to a remote device 16, such as a master computer, where system operators use the information to control the operation of the power system.

The information from the relays can also be moved to another remote computer 18 from the RTU/communications processor 14 or from master computer 16. The information provided to the master computer 16 is used for analysis and is usually stored. In existing systems, for instance, the "system operation" information developed by relays in operation in response to power line conditions is not stored at the digital relay, but rather is transmitted to a remote system-based computer for analysis and storage.

There are a number of human interactions with a protective relay which can occur during operation of the relay. As an example, a system operator will visit a power substation and inspect the "target" indications (lights) on the front panel of the relay, which indicate particular actions which have been taken by the relay. The operator will reset the targets and typically will indicate such action in a separate log of some kind. The same may be true if the operator changes the relay's operational settings. These and other actions taken by the operator may be entered into a separate handwritten log at the relay location (the substation), or in some cases entered into a computer which then transmits the information to a remote location, such as to the master computer.

However, this record of actions taken by an operator is often incomplete or may be missing entirely. An operator reviewing the log at a later visit is often unable to accurately determine what actions, if any, have been taken with the relays at the substation, including date and/or time of the action. All of this information is important relative to analyzing operation of the relays and the condition of the power system. Further, if any such information or partial information has been transmitted to a remote computer, it is difficult and time-consuming for the operator to retrieve the information at the substation location; hence, such retrieval may not be accomplished, and any analysis/review of previous actions is left undone. It is thus desirable to have more complete, accurate and accessible information concerning human interactions relative to the protective relay and its operation.

SUMMARY OF THE INVENTION

Accordingly, the present invention is an improvement in a digital protective relay for power systems, comprising: a memory location in the digital protective relay for storing information entered by an operator concerning the relay; a functional assembly for entering said information to the memory location and for adding to existing reports provided by the relay an indication that information has been entered into the memory location relating to said report; and means for retrieving the entered information.

BRIEF DESCRIPTION OF THE DRAWING

FIG. 4 is an event report showing an example of notes entered by an operator associated with the report.

FIG. 5 is an example of a sequence-of-events report with notes entered by an operator.

FIG. 6 is a settings report with entry information included.

BEST MODE FOR CARRYING OUT THE INVENTION

Figure 2:
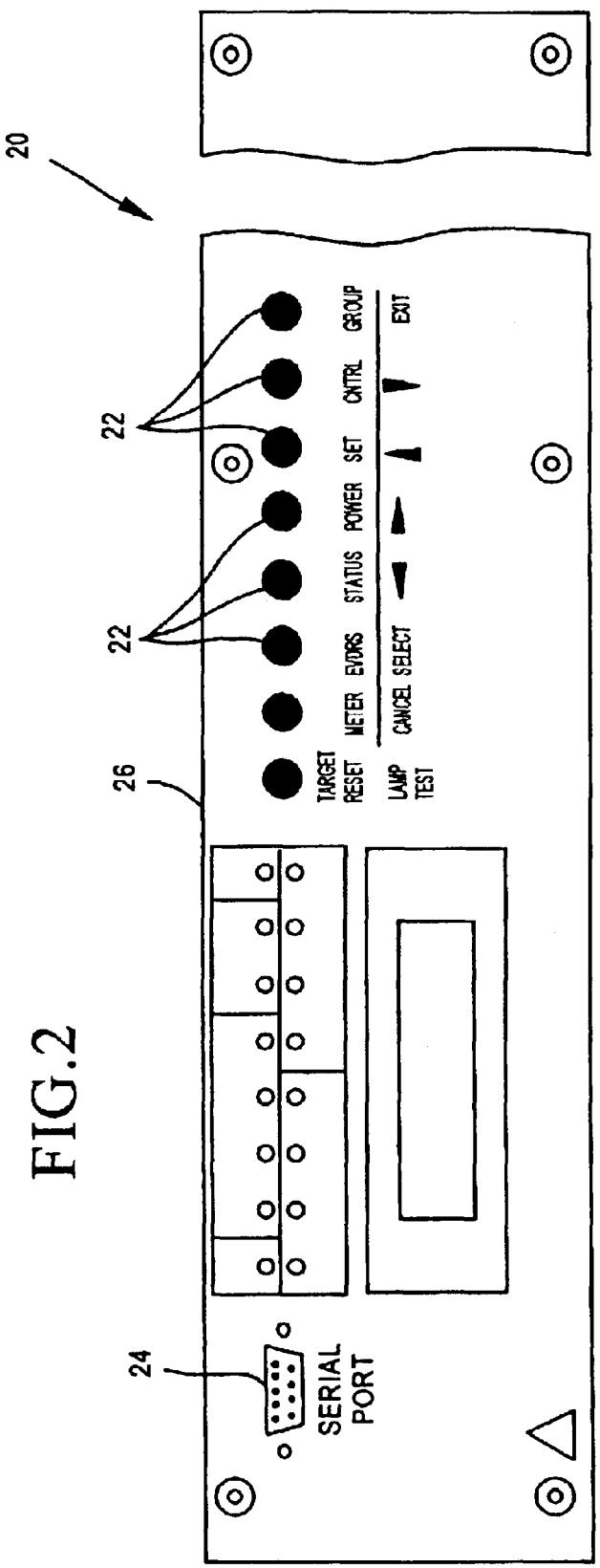
FIG. 2 is a diagram showing the front panel of a protective relay and a plurality of targets thereon.

The present invention is directed toward the storing of information concerning actions taken by a human operator and related information such as operator notes, with respect to a digital protective relay, wherein such actions and information are stored within the relay itself. FIG. 2 shows the front panel of a typical digital microprocessor relay used in the protection, monitoring and control of electric power systems. Digital relays can take many forms and perform a wide variety of protection functions. Typically, a digital relay has a front panel 20 in which are mounted a plurality of "target" lights 22, each light being associated with a particular action capable of being taken by the relay.

For instance, the front panel lights 22 might indicate that a fault has occurred on one or more of the phase lines and/or that a tripping action has been initiated. The number of target lights 22 will vary from relay to relay, depending upon the specific protection functions incorporated in the relay. The relay will also typically operate on the basis of a plurality of settings which are either established at the factory or set by the operator in accordance with the particular arrangement and control of a specific electric power system or portion thereof with which the relay is used. The settings can be entered or changed through a standard interface (serial port) input, via a computer or other entry device. A serial port such as shown at 24 in FIG. 2 can be located on the front or rear panel of the relay. When an operator visits the substation, he will inspect the targets 22 and reset them via a panel reset button 26, if appropriate. The operator can also change the settings if desired. Other actions taken by the operator relative to the power system, based on information supplied by the relay, can be accomplished.

Figure 1:
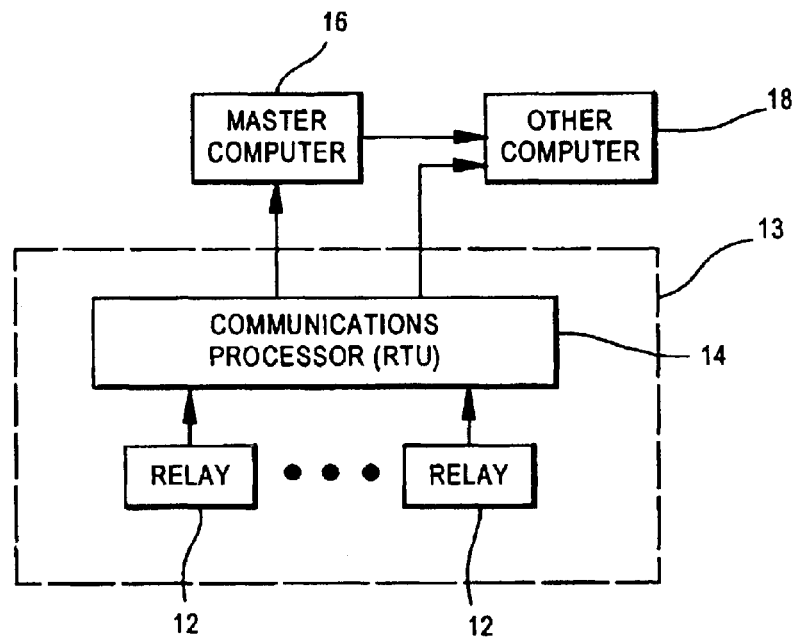
FIG. 1 is a block diagram showing an arrangement for information transmittal between protective relays at a substation and a remote computer.
Figure 3:
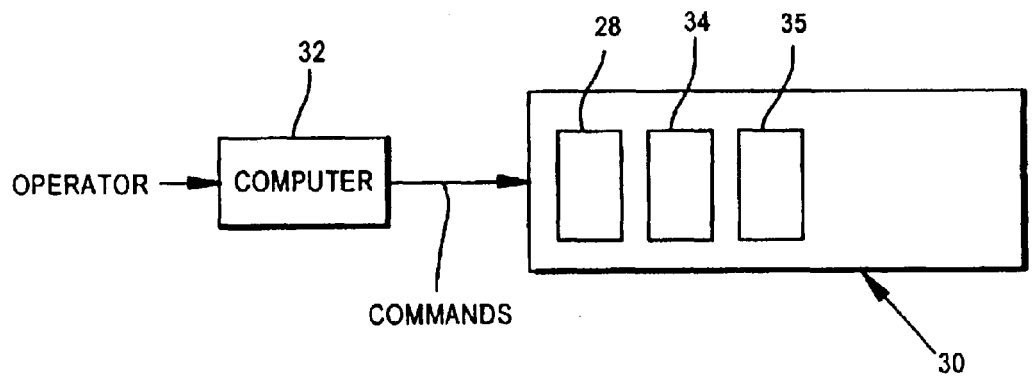
FIG. 3 is a simple block diagram showing the information storage system of the present invention.

In the present invention, instead of entering such operator actions in a separate log, located physically apart from the relay, the operator will enter the actions and any additional pertinent information in the form of notes, into a database or information area in the relay 30 (FIG. 3). The actions and related information concerning the relay and its data may be entered into the database using a computer 32 connected to the serial communication port on the relay.

In one example, involving oscillographic events, the operator could use a specific known command, such as "HIS", for history, to list the specific events which have occurred, and then to use a new command, such as "NOTE", along with a number, for entry of and later for access to the database area 28 where the action taken, as well as associated commands and notes, are located.

The actual event report, besides current, voltage, frequency and oscillography information, or other information, depending on the event, will include a new column, identified such as "NOTES", for instance, which contains an identifier, such as the operator's initials, indicating that an action note does exist for that particular event. Such a report is shown in FIG. 4, with a "NOTES" column listing, for example, an operator's initials "ABC". The note can then be recalled with a command, which would show the particular action taken and any other information. For instance, the operator might record a message relating to a fault, such as "tree branch found, tree trim scheduled", including date and time of entry. It would also be possible to include the entire information in the report, instead of a reference to the information stored in the database 28.

Similarly, an information area or database 34 in the relay will contain operator entered notes concerning actions or other information associated with particular events registered in the sequence-of-events recorder (SER) portion of the relay. For SER events, the operator will use a particular command, such as "SER", to list the particular event records, and another command like "NOTESER", along with a numeral, to enter and then later read a note associated with the particular numbered event.

An "SER" report will include as usual the date and time of the event, as well as an indication of which protection function (element) of the relay was first asserted and then de-asserted. The report itself will also include a new column, which includes an identifier that a note exists for the particular function (element) being asserted or de-asserted. A typical SER report is shown in FIG. 5, containing a notes column.

An information area or database may also be available in such a relay for the operational settings for the relay. This area, shown at 35 in FIG. 3, will contain information concerning each setting group, including the setting process, for the relay. The operator in this information area or database may identify any changes or alteration to the individual settings or setting groups via notes. The stored setting information, which can be inspected by a specific command, e.g. "SHO", will include the date, time and operator responsible for entry or change of the settings. A typical settings report is shown for example in FIG. 6.

Thus, the actions/settings reports of the relay will have information indicating operator's actions, which can be stored and retrieved in the relay itself. Other information or actions taken by the operator can also be recorded in the relay. For instance, an operator's action in pushing any button on the front panel of the relay, including the target-reset button, can be logged as an event in the SER database 34. The start and end of communications between the operator and the relay can also be recorded as events in the SER register 34.

In another example, a security access log can be maintained within the relay database 28 with the log showing the password used in attempting access to the relay, the date and time of the attempts and whether or not the attempted access succeeded. The log can also include the name of the person attempting access, as provided by that person.

An analysis of the access log can be carried out to detect and evaluate unauthorized access or attempts, based on information concerning the date, time, user, the various passwords attempted, etc. The results of the analysis can be saved and reported and by closure of a contact if warranted. In addition, after a selected number of attempts, e.g. three, further attempts for access could be prevented.

Other information concerning operator action/comments can be recorded in the relay database associated with particular operations or reports developed by the relay, so that the information can be conveniently retrieved and received. Hence, a running record is maintained of not only the typical reports produced by the relay in its normal protective operations, but also information concerning actions directed toward the relay by an operator associated with the operation of the relay and the data from the power system. This recorded information is associated with existing reports and entered by the operator, in the form of actions taken and related information such as notes.

The overall history of human events can be logged and maintained for a selected number of actions. The information can also be summarized. The summarized information can be maintained for a given number of human action "events", for instance 100 past events, while the detailed full reports, notes, etc. could be maintained for only the most recent events, for instance the last 10 events. This, of course, could be varied. A particular command can be used to clear the information from the database.

The information maintained in the relay, in its database, in selected information areas, so that an operator can readily determine what has been done by previous operator actions, and also in some cases the reasons for the action. The actual information is readily available to the operator, but is identified to the operator by brief reference indications in the conventional reports known to the operator. The operator's action information thus does not get "lost" in the database, but is readily apparent to the operator.

This system is advantageous over existing systems, which transmit information to a remote central computer, away from the relay itself; the present invention thus results in important information being readily accessible to the operator at the relay. The present invention thus goes against the direction of the art by maintaining specific important information at the local relay.

Further, the present invention, by storing operator actions and notes in the database of the local relay, with a notation in existing records that such information exists, provides significant, easily accessible information for an operator concerning previous actions taken relative to the relay in addition to reports and information concerning the operational results of the relay.

Although a preferred embodiment of the invention has been described for purposes of illustration, it should be understood that various changes, modification and substitutions might be incorporated in the embodiment without departing from the spirit of the invention, which is defined by the claims, which follow.

What is claimed is:

1. A digital protective relay for power systems comprising:
- a memory location for storing operator action information entered by an operator, the operator action information related to the digital protective relay;
- a functional assembly for entering the operator action information into the memory location and for selectively adding, to existing reports provided by the digital protective relay, indications when operator action information associated with the existing reports has been entered into the memory location; and
- means for retrieving the operator action information from the memory location.

2. The digital protective relay of claim 1, wherein the operation action information includes actions taken by the operator relating to the digital protective relay.

3. The digital protective relay of claim 2, wherein the actions include changes to the operational settings of the digital protective relay.

4. The digital protective relay of claim 2, wherein the actions include resetting targets on a front panel of the digital protective relay.

5. The digital protective relay of claim 1, wherein the indications are provided in a column of the existing reports and include an identification of the operator taking the action.

6. The digital protective relay of claim 1, wherein the operator action information includes notes of the actions taken by the operator.

7. The digital protective relay of claim 1, wherein the operator action information includes operator-entered security access information relative to the digital protective relay, including identification of the operator attempting access, any password used, date and time of the access attempt and an indication of success or failure of the access attempt.

8. The digital protective relay of claim 1, wherein one report of the existing reports includes an SER report having sequence of events information.

9. The digital protective relay of claim 1, wherein one report of the existing reports provides setting group information for the digital protective relay.

10. The digital protective relay of claim 1, wherein one report of the existing reports includes oscillographic event information.

11. The digital protective relay of claim 1, wherein the operator action information is limited to a selected number of immediate past operator action information entries.

12. The digital protective relay of claim 1, further including a means for selectively deleting the operator action information from the memory location.

* * * * *